(12) United States Patent
Farah et al.

(10) Patent No.: US 8,357,768 B2
(45) Date of Patent: Jan. 22, 2013

(54) LOW HAZE THERMOPLASTIC POLYURETHANE USING CO-CHAIN EXTENDERS

(76) Inventors: Hani Farah, Sugar Land, TX (US); Francisco Lerma, Jr., Lake Jackson, TX (US)

( * ) Notice: Subject to any disclaimer, the term of this patent is extended or adjusted under 35 U.S.C. 154(b) by 331 days.

(21) Appl. No.: 12/085,612

(22) PCT Filed: Nov. 17, 2006

(86) PCT No.: PCT/US2006/044545
§ 371 (c)(1),
(2), (4) Date: May 28, 2008

(87) PCT Pub. No.: WO2008/057101
PCT Pub. Date: May 15, 2008

(65) Prior Publication Data
US 2009/0104449 A1  Apr. 23, 2009

Related U.S. Application Data

(60) Provisional application No. 60/748,720, filed on Dec. 9, 2005.

(51) Int. Cl.
*C08G 18/32* (2006.01)
*C08G 18/42* (2006.01)
*C08G 18/76* (2006.01)
(52) U.S. Cl. ........................... 528/80; 528/85
(58) Field of Classification Search .................... 528/80, 528/85
See application file for complete search history.

(56) References Cited

U.S. PATENT DOCUMENTS

| | | | |
|---|---|---|---|
| 3,730,936 A * | 5/1973 | Bugmann | 524/871 |
| 4,245,081 A * | 1/1981 | Quiring et al. | 528/65 |
| 4,306,052 A * | 12/1981 | Bonk et al. | 528/67 |
| 4,371,684 A | 2/1983 | Quiring et al. | |
| 4,385,133 A | 5/1983 | Alberino et al. | |
| 4,521,582 A | 6/1985 | Goyert et al. | |
| 4,522,975 A | 6/1985 | O'Connor et al. | |
| 4,597,927 A * | 7/1986 | Zeitler et al. | 264/85 |
| 4,741,961 A * | 5/1988 | Frisch et al. | 428/412 |
| 5,167,899 A | 12/1992 | Jezic | |
| 6,521,164 B1 | 2/2003 | Plummer et al. | |
| 8,242,228 B2 * | 8/2012 | Cox et al. | 528/65 |
| 2001/0056170 A1 * | 12/2001 | Kaufhold et al. | 528/83 |
| 2010/0109200 A1 * | 5/2010 | Cox et al. | 264/334 |

FOREIGN PATENT DOCUMENTS

| | | |
|---|---|---|
| EP | 1 262 504 A | 12/2002 |
| WO | WO 02/50151 A1 * | 6/2002 |

OTHER PUBLICATIONS

Saunders, et al., High Polymers, vol. XVI; "Polyurethanes, Chemistry and Technology", Interscience Publishers, New York, Part I, pp. 32-42, 44-54 (1962) and pp. 5-6, 198-199 (1964).
Saunders, et al., Organic Polymer Chemistry, Chapman and Hall, London, pp. 323-325 (1973).
Buist, Developments in Polyurethanes, vol. I, Applied Science Publishers, pp. 1-76 (1978).
Frisch, et al, "Advances in Urethane Science and Technology", Technomic Publishing Company, Westport, Conn., 1973, pp. 188-193.

* cited by examiner

*Primary Examiner* — Rabon Sergent
(74) *Attorney, Agent, or Firm* — Christopher P. Demas

(57) ABSTRACT

The present invention is a low haze thermoplastic polyurethane (TPU) comprising structural units of a diisocyanate; a diol and three different chain extenders (butanediol chain extender; a different linear diol co-chain-extender and a cyclic co-chain-ex-tender). The TPU has good combinations of light transmission and clarity, low temperature flexibility, and high moisture vapor transition rates compared to other commercial or known TPUs. The preferred composition is a TPU that is based on polycaprolactone as diol, MDI as the diisocyanate monomer, butanediol chain extender, 1,3 propanediol linear chain co-extender and cyclohexanedimethanol cyclic chain co-extenders, and has good clarity and tensile strength.

8 Claims, No Drawings

US 8,357,768 B2

LOW HAZE THERMOPLASTIC POLYURETHANE USING CO-CHAIN EXTENDERS

This application claims the benefit of U.S. Provisional Application No. 60/748,720, filed Dec. 9, 2005.

This invention relates to low haze thermoplastic polyurethanes (TPU's) that are based on a combination of three different co-chain extender structural units.

As well known in this technology area, TPU's are prepared by reacting diisocyanate compounds, polymeric diols and difunctional chain extenders. As used herein, unless otherwise limited expressly or by the context to solely the urethane products of diols and chain extenders with only hydroxyl reactive moieties, the term TPU will also refer to thermoplastic polyurethane ureas or "TPUU's" prepared by reacting diisocyanate compounds with an amine instead of or in addition to the hydroxyl-containing chain extender compounds.

Polyester diols are known to provide very desirable TPU's with good physical properties, hardness and abrasion resistance, low temperature flexibility and high moisture vapor transition rates (MVTR). In earlier U.S. Pat. Nos. 6,521,164 and 4,371,684 it has been suggested to prepare TPU's based on these and other diols with combinations of chain extenders to improve processing and injection moldability. Historically, however, little has been disclosed about improving transparency in these TPU's. It is therefore desired to improve the optical transparency properties of TPU's prepared from polyester diols.

The present invention addresses the deficiencies in the art and provides an improved low haze thermoplastic polyurethane (TPU) comprising soft segment structural units and hard segment structural units characterized in that it comprises: (a.) soft segment units in an amount of from about 30 to about 70 weight percent based on total TPU weight and (b.) hard segment units in an amount of from about 30 to about 70 weight percent based on total TPU weight, which hard segment comprises structural units of: b.1 chain extender and b.2 diisocyanate; wherein the chain extender units comprise: (b.1.1.) 1,4-butanediol ("butanediol") chain extender units in an amount of from about 30% to about 96% equivalent percent based on total equivalents of chain extender; (b.1.2.) second linear chain extender units other than from butanediol, which chain extender has a molecular weight of less than 400 Daltons, in an amount of from about 2% to about 35% equivalent percent based on total equivalents of chain extender; (b.1.3.) cyclic chain extender units different from chain extender units (b.1.2.) and having a molecular weight of less than 400 Daltons, in an amount of from about 2% to about 35% equivalent percent based on total equivalents of chain extender; and wherein the index is from about 0.95 to about 1.10.

In a preferred embodiment, in the TPU, the second chain extender units b.1.2 are selected from the group consisting of units of ethylene glycol, diethylene glycol, 1,3 propanediol, cyclohexane dimethanol, ethylene diamine, 2-methyl, 1,5-pentanediamine, 1,6-hexanediamine, ethanol amine and blends of two or more of these and most preferably are diethylene glycol.

In another preferred embodiment, in the TPU, the cyclic chain extender units b1.3 are selected from the group consisting of units of cyclohexane dimethanol ("CHDM"), hydroquinone bis 2-hydrxyethyl ether (HQEE) and blends of these and are most preferably CHDM. Another preferred embodiment is a TPU comprising: (b.1.1.) butanediol chain extender units in an amount of from about 60% to about 90% equivalent percent based on total equivalents of chain extender; (b.1.2.) linear chain extender units other than from butanediol, in an amount of from about 5% to about 20% equivalent percent based on total equivalents of chain extender; and (b.1.3.) cyclic chain extender units different from extender units b.1.2, in an amount of from about 5% to about 20% equivalent percent based on total equivalents of chain extender. Also preferred is such a TPU comprising: (b.1.2.) linear chain extender units other than from butanediol, in an amount of from about 8% to about 15% equivalent percent based on total equivalents of chain extender; (b.1.3.) cyclic chain extender units different from chain extender units b.1.2, in an amount of from about 8% to about 15% equivalent percent based on total equivalents of chain extender; and (b.1.1.) butanediol chain extender units in an amount that makes up the balance of chain extender.

Preferred TPU's according to the invention have a haze value of less than about 30 percent, more preferably less than about 20% and most preferably less than about 10%. In the TPU's according to the invention it is preferred to have a hardness greater than about 80 A (as measured using the Shore A scale) and less than about 75 D (as measured using the Shore D scale) and more preferably greater than about 85 A and less than about 100 A.

In another preferred embodiment, the TPU comprises: (a.) polycaprolactone diol soft segment units in an amount of from about 40 to about 60 weight percent based on total TPU weight and (b.) hard segment units in an amount of from about 60 to about 40 weight percent based on total TPU weight, which hard segment comprises structural units of: (b.1) chain extender and (b.2) 4,4'-diisocyanatodiphenylmethane ("MDI"); wherein the chain extender units comprise: (b.1.1.) butanediol chain extender units in an amount of from about 80% to about 90% equivalent percent based on total equivalents of chain extender; (b.1.2.) 1,3-propanediol ("PDO") chain extender units, in an amount of from about 5% to about 15% equivalent percent based on total equivalents of chain extender; (b.1.3.) cyclohexane dimethanol ("CHDM") chain extender units in an amount of from about 5% to about 15% equivalent percent based on total equivalents of chain extender; and wherein the index is from about 0.99 to about 1.05.

In another embodiment, the invention is a cast article, an injection molded article, an adhesive, an extruded article, a coating, a film, or a sealant that is prepared from a TPU as described above.

As used herein and generally in this area of technology, when TPU's are referred to as "comprising" or "containing" amounts of the reactant components (for example, diisocyanate, diol, and chain extender), their structural units or simply their "units", this refers to the fact that the TPU contains the reaction product or remnant of that reactant in polymerized form.

As known to practitioners in this field, the two primary components of TPU's are referred to as the hard segment and the soft segment. The "hard segment" is the combination of the diisocyanate and chain extender components and the "soft segment" is the balance of the TPU and, in the present invention, is the diol component. In the TPU's according to the present invention, the hard segment preferably constitutes at least about 30 weight percent (wt %) of the polymer based on total weight of the hard and soft segments, preferably at least about 35 wt %, and more preferably at least about 40 wt %. In the TPU's according to the present invention, the hard segment desirably constitutes up to and including about 70 wt %, preferably up to and including about 65 wt % and more preferably up to and including about 60 wt %. These levels are used in order to provide products according to this invention having a Shore D hardness of not more than about 75, preferably not more than about 60 and more preferably not more than about 55 and of at least about 30, preferably at least about 35 and more preferably at least about 40.

Diisocyanates suitable for use in preparing the hard segment of the TPU's according to this invention are well known in the art and include aromatic, aliphatic, and cycloaliphatic diisocyanates and combinations thereof. A structural unit derived from diisocyanate (—OCN—R—NCO—) is represented by the following formula:

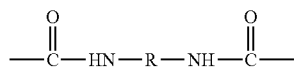

where R is an alkylene, cycloalkylene, or arylene group. Representative examples of these diisocyanates can be found in U.S. Pat. Nos. 4,385,133; 4,522,975; and 5,167,899, which teachings are incorporated herein by reference. Preferred diisocyanates include 4,4'-diisocyanatodiphenylmethane, p-phenylene diisocyanate, 1,3-bis(isocyanatomethyl)-cyclohexane, 1,4-diisocyanato-cyclohexane, hexamethylene diisocyanate, 1,5-naphthalene diisocyanate, 3,3'-dimethyl-4,4'-biphenyl diisocyanate, 4,4'-diisocyanato-dicyclohexylmethane, and 2,4-toluene diisocyanate. More preferred are 4,4'-diisocyanato-dicyclohexylmethane and 4,4'-diisocyanato-diphenylmethane. Most preferred is 4,4'-diisocyanatodiphenylmethane ("MDI").

Depending upon the specific diisocyanate, diols and chain extenders according to the present invention, the amount of diisocyanate incorporated into the TPU is selected to provide the desired "index". As known to practitioners in this area, the "index" is the molar ratio of the isocyanate functional units to the sum of the isocyanate-reactive functional units (usually polyester diol plus chain extenders). For the polymers according to the present invention, this ratio is preferably at least about 0.95 parts isocyanate unit per part isocyanate-reactive units (that is, about 0.95:1 or about "0.95"), and more preferably at least about 0.99. Preferably, for the polymers according to the present invention, this ratio is up to and including about 1.10:1 ("1.10"), more preferably up to and including about 1.08, more preferably up to and including about 1.05, most preferably up to and including about 1.01. As known to those skilled this area of technology, the amount of diisocyanate to be used in preparing the TPU is then calculated knowing the desired percentage hard and soft segment, the index of the TPU and the equivalent weights of the diisocyanate, diols and chain extender(s) that are being used to prepare the compositions according to the present invention.

The diols used in making thermoplastic polyurethanes are well known in the art and require no detailed description here. Diols useful in the present invention are compounds which contain an average of about two isocyanate-reactive groups, generally active-hydrogen groups, such as —OH, primary or secondary amines, and/or —SH. Representative of suitable diols are generally known and are described in such publications as High Polymers, Vol. XVI; "Polyurethanes, Chemistry and Technology", by Saunders and Frisch, Interscience Publishers, New York, Vol. I, pp. 32-42, 44-54 (1962) and Vol II. Pp. 5-6, 198-199 (1964); Organic Polymer Chemistry by K. J. Saunders, Chapman and Hall, London, pp. 323-325 (1973); and Developments in Polyurethanes, Vol. I, J. M. Burst, ed., Applied Science Publishers, pp. 1-76 (1978). Representative of suitable diols include polyester, polylactone, polyether, polyolefin, polycarbonate diols, and various other diols.

The suitable polyester diols include the groups of diols referred to as aliphatic polyester diols, polycaprolactone diols and aromatic polyester diols. Polyester diols suited for use in the TPU's of the present invention are commercially available and can also be prepared for specific combinations of costs and properties by known techniques.

It will be understood that they include chain extended polyesters made from a glycol (for example, ethylene and/or propylene glycol) and a saturated dicarboxylic acid (for example, adipic acid as well as polycaprolactonediols). By way of non-limiting example there may be mentioned poly (ethylene adipate) glycol, poly(propylene adipate) glycol, poly(butylene adipate) glycol, poly(neopentyl sebacate) glycol, etc.

Suitable polyester diols include those obtainable by reacting such diols as 1,4-butanediol, hydroquinone bis(2-hydroxyethyl)ether, ethylene glycol, diethylene glycol, triethylene glycol, propylene glycol, dipropylene glycol, 2-methyl-2-ethyl-1,3 propanediol, 2-ethyl-1,3-hexanediol, 1,5-pentanediol, thiodiglycol, 1,3-propanediol, 1,3-butanediol, 2,3-butanediol, neopentyl glycol, 1,2-dimethyl-1,2-cyclopentanediol, 1,6- hexanediol, 1,2-cyclohexanediol, 1,2-dimethyl-1,2-cyclohexanediol, glycerol, trimethylol propane, trimethylol ethane, 1,2,4-butanetriol, 1,2,6-hexanetriol, pentaerythritol, dipentaerythritol, tripentaerythritol, anhydroaneaheptitol, mannitol, sorbitol, methyl-glucoside, and the like with such dicarboxylic acids as adipic acid, succinic acid, glutaric acid, azelaic acid, sebacic acid, malonic acid, maleic acid, fumaric acid, phthalic acid, isophthalic acid, terephthalic acid, tetrachlotophthalic acid and chlorendic acid; the acid anhydrides, alkyl esters and acid halides of these acids may also be used.

The suitable polyester diols typically have a molecular weight of at least about 300, preferably at least about 500, more preferably at least about 1,000 and more preferably at least about 1,500 and most preferably at least about 1,800 Daltons, and preferably not greater than 8,000, more preferably not greater than 5,000, more preferably not greater than 3,000 and most preferably not greater than 2,500 Daltons and most preferably have a molecular weight of about 2000.

A preferred polyester diol is a polycaprolactone ("PCL") diol. The structural units resulting from PCL diols suitable for use in preparing the TPU's according to the present invention are preferably represented by the following general formula:

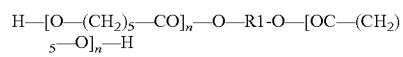

Where each n is independently from about 3 to about 90, R1 is an alkyl, aryl or (poly-) ether type of radical, with a molecular weight of less than 1000 Daltons.

The molecular weight of the PCL is preferably at least 500, more preferably at least 1,000 and more preferably at least 1,500 and most preferably at least about 1,800 Daltons, and preferably not greater than 8,000, more preferably not greater than 5,000, more preferably not greater than 3,000 and most preferably not greater than 2,500 Daltons. These PCL diols are generally well known in the industry and commercially available PCL's include the "Tone" brand commercial polycaprolactone diols commercially available from The Dow Chemical Company.

The known adipate types of polyester diols are also suitable for use in preparing the TPU's according to the present invention. Preferred adipate diols are represented by the following general formula:

where n is from about 2 to about 40, and $R_2$ represents the structural unit(s) from one or more diol(s) (including blends of two or more) such as 1,4-butanediol used to prepare the diol.

The molecular weight of the adipate diol is preferably at least 300, more preferably at least 600, more preferably at least 1000 Daltons, more preferably at least about 1,500 and most preferably at least about 1,800, and preferably not greater than 8,000, more preferably not greater than 5000, and most preferably not greater than 3000 Daltons. Examples of commercially available adipate diols include the grades of Fomrez brand adipate diol produced by Crompton such as Fomrez 44-56 or Fomrez 44-57.

The polyether diols preferred for use in preparing the TPU's according to the present invention are the poly(oxypropylene)-poly(oxyethylene) glycols which are also referred to as propylene oxide/ethylene oxide diols or "EO—PO" diols. These polyether diols are well known for preparation of polyurethanes and many suitable types of these polyether diols area commercially available.

Poly(oxypropylene)-poly(oxyethylene) diols suitable for use in the compositions according to the present invention can be either: (1) a "capped" or "tipped" diol in which a poly (oxypropylene) glycol is reacted further with ethylene oxide giving rise to oxyethylene group blocks on each end of the diol or (2) a more random poly (oxypropylene)-poly(oxyethylene) glycol in which the propylene oxide and ethylene oxide reactants are introduced together or in alternating portions. The preparation of both types of diols is described in "Polyurethanes: Chemistry and Technology," Part 1. Chemistry, by J. H. Saunders and K. C. Frisch, Interscience, New York, 1962, pp. 36-37. The technique of tipping is further described in "Advances in Urethane Science and Technology" by K. C. Frisch and S. L. Reegan, Technomic Publishing Company, Westport, Conn. 1973, pp. 188-193. The molecular weight of the polyether diol is generally at least about 500, preferably at least about 1,000, more preferably at least about 1,500 and most preferably at least about 1,800 Daltons, and preferably not greater than about 8,000, more preferably not greater than about 5,000, more preferably not greater than about 3,000 and most preferably not greater than about 2,500 Daltons.

As known to those practicing in the area of TPU's, the diol(s) used as the soft segment component can sometimes contain minor amounts (preferably less than about 10 mole percent, more preferably less than about 5 mole percent) of a higher functional reactant, such as a triol, as an impurity or for property modification purposes such as flow or processability modification. However, for the preferred TPU's according to the present invention, no higher functional polyol is added to or contained in the soft segment diol.

The hard segment of the TPU of the present invention contains structural units of at least three chain extenders. The overall amount of chain extender component is incorporated into the TPU in amounts determined by the selection of the specific reactant components, the desired amounts of the hard and soft segments and the index sufficient to provide good mechanical properties, such as modulus and tear strength. The chain extender component can sometimes contain a minor amount (preferably less than about 10 mole percent, more preferably less than about 5 mole percent) of a higher functional reactant, such as a triol, as an impurity or for property modification purposes such as flow or processability modification. However, for preferred TPU's according to the present invention, no higher functional chain extender is added to or contained in the chain extender(s).

The first chain extender is 1,4-butanediol ("butanediol" or "BDO"). A structural unit of BDO chain extender is represented by the following formula:

The butanediol chain extender is incorporated into the TPU in amounts sufficient to provide good mechanical properties, such as modulus and tear strength. This is generally at levels of at least about 30 equivalent percent (eq. %) based on total equivalents of the all the chain extenders, preferably at least about 60 eq. %, more preferably at least about 70 eq. % and more preferably at least about 80 eq. %. The butanediol chain extender is incorporated into the TPU up to levels where hard segment phase segregation tends to occur and/or light transmission properties are affected, which is generally at levels less than or equal to about 96 eq. %, preferably less than or equal to about 93 eq. %, and more preferably less than or equal to about 90 eq. % based on total equivalents of all chain extender.

The second chain extender is a linear chain extender other than 1,4-butanediol. These chain extenders are generally diol, diamine or amino alcohol compounds characterized by having a molecular weight of not more than 400 Daltons. In this context, by "linear" it is meant a chain extender compound that is not cyclic nor having alkyl chain branching from a tertiary carbon. A structural unit of linear chain extender is represented by the following formula:

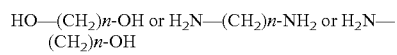

The second linear chain extender is incorporated into the TPU in amounts sufficient to provide, in conjunction with the other extenders, significant improvement in clarity. This is generally at levels of at least about 2 equivalent percent (eq. %) based on total equivalents of the all the chain extenders, more preferably at least about 5 eq. % and more preferably at least about 8 eq. %. The second linear chain extender is incorporated into the TPU up to levels where loss of mechanical properties, such as modulus, tends to occur, which is generally at levels less than or equal to about 35 eq. %, preferably less than or equal to about 20 eq. %, and more preferably less than or equal to about 15 eq. % based on all total equivalents chain extender.

Suitable second linear chain extenders include ethlyene glycol and diethylene glycol; ethylene glycol and 1,3-propanediol; 1,6 hexanediol; 1,5 heptane diol; or diethylene glycol or triethyleneglycol and 1,3-propanediol or a combination thereof. When the chain extender is a diol, the resulting product is a TPU. As mentioned above, when the chain extender is a diamine or an amino alcohol, the resulting product is technically a TPUU.

The third chain extender is a cyclic chain extender. These chain extenders are also generally diol, diamine or amino alcohol compounds characterized by having a molecular weight of not more than 400 Daltons. In this context, by "cyclic" it is meant that the molecule has a 5 to 8 member ring structure with hydroxyl-alkyl branches. Structural units of cyclic chain extender are represented by the following formulae:

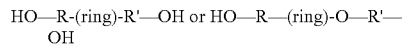

where R and R' are one to five carbon alkyl chains and the ring has 5 to 8 members, preferably all carbons and including such structural units where one or both of the terminal OH's can be replaced with —$NH_2$.

A structural unit of cyclohexanedimethanol (CHDM), a preferred cyclic chain extender, is represented by the following formula:

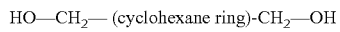
HO—CH$_2$— (cyclohexane ring)-CH$_2$—OH

The cyclic chain extender is incorporated into the TPU in amounts sufficient to provide, in conjunction with the other extenders, a significant improvement in clarity. This is generally at levels of at least about 2 equivalent percent (eq. %) based on total equivalents of the all the chain extenders, more preferably at least about 5 eq. % and more preferably at least about 8 eq. %. The cyclic chain extender is incorporated into the TPU up to levels where loss of mechanical properties such as modulus tends to occur, which is generally at levels less than or equal to about 35 eq. %, preferably less than or equal to about 20 eq. %, and more preferably less than or equal to about 15 eq. % based on total equivalents chain extender.

Suitable cyclic chain extenders include cyclohexane dimethanol ("CHDM"), and hydroquinone bis 2-hydrxyethyl ether (HQEE). When the chain extender is a diol, the resulting product is a TPU. As mentioned above, when the chain extender is a diamine or an amino alcohol, the resulting product is a TPUU.

The TPU's according to the present invention can be manufactured by processes commonly used to make these types polymers such as by reactive extrusion and other methods known generally to those skilled in the art. The preferred TPU is prepared from starting materials in amounts as prescribed above and effective to produce an extrudable or injection moldable TPU that is preferably elastomeric.

The preferred TPUs according to the present invention are also characterized by having a hardness, as measured by the commonly used Shore test, using the Shore A scale, of at least about 80 (that is, about 80 A), preferably at least 85 A, and more preferably, at least about 90 A. The preferred TPUs according to the present invention are also further characterized by having a hardness of less than or equal to about 75 D (as measured by the Shore D scale), preferably less than or equal to about 100 A, and more preferably less than or equal to about 90 A.

The preferred TPU's according to the invention are further characterized by having good optical properties and preferably have relatively low haze. Preferably the haze, as measured by ASTM D 1003-95 using Hunterlab Colorquest Instrument, is less than about 30%, preferably less than about 20% and more preferably less than about 10%.

The TPU or TPUU of the present invention is useful, for example, in exterior parts of foot-wear and other applications where clarity is important as in coating, a film, or a sealant, as well as in a variety of articles including cast articles, injection molded articles, and extruded articles, such as shoe soles, hose jacketing, tubing, castor wheels, and as a barrier layer for hospital gowns.

The following examples are for illustrative purposes only and are not intended to limit the scope of this invention. In these and following tables and experiments, the amounts of reactant components shown are the indicated weight or equivalent percentages of reactants used to make the material and which result in generally the same proportional amounts of the reactant or structural unit being incorporated in the polymer.

EXAMPLES

The indicated levels of the raw materials were provided from tanks using tubing, pumps, and flow meters to control the flow and provide the proper ratios to the feed throat of an extruder.

The diisocyanate is MDI, 4,4'-diisocyanatodiphenylmethane, obtained as ISONATE 125M MDI (a trademark of The Dow Chemical Company).

The diol used in the experiments is a polycaprolactone diol commercially available from The Dow Chemical Company prepared by the reaction of ε-caprolactone using 1,4 butanediol as an initiator and having a molecular weight of 2,000.

The BDO is 1,4-butanediol obtained from BASF Corporation.

The second linear chain extender is PDO, 1,3-propanediol (99.7%) obtained from the Shell Chemical Company.

The cyclic chain extender, CHDM, is 1,4-Cyclohexanedimethanol obtained as CHDM-D from the Eastman Chemical Company.

The catalyst is stannous octoate obtained as Dabco T-9 from Air Products & Chemicals, Inc and was used at a level of 0.02 percent.

The stabilizer package is IRGANOX 1010 antioxidant (a trademark of Ciba-Geigy) used at a level of 0.2 percent based on TPU weight. ADVAWAX 280 wax was used at a level of 0.25 percent based on TPU weight.

The target index (equivalent:equivalent ratio of the diisocyanate to the total equivalents of diol and chain extender) was 1.03:1.

The components were dried and directly injected in the amounts shown in Table 1 below into the feed throat of a twin screw extruder and allowed to fully react at temperatures up to 220° C. The extrudate was passed through a die and subsequently cut under water to form pellets. The water was removed using a spin dryer from which the material was transferred to a desiccant dryer at 80 degrees C. and dried prior to processing. The materials are then injection molded at 220 degrees C. into plaques that were 6.25 mm thick by 87.5 mm wide by 162.5 mm long) and these plaques were tested for haze using a Hunterlab Colorquest Instrument and data reported in %. Calibrations are performed on the Hunterlab Coloquest prior to use.

In these compositions summarized in Table 1 below, the indicated weight percentages (wt %) of the components are based on total weight of the TPU. The equivalent ratios (eq. basis) of the TPU composition components are also shown where the Diol component has been calculated as one equivalent and the equivalents of the rest of the components are shown as their ratio with respect to one equivalent Diol. The chain extender equivalent percentages (eg. %) are also given based on total equivalents of chain extender.

TABLE 1

|  | Comp A | Comp B | Comp C | Comp D | Comp E | Example 1 |
|---|---|---|---|---|---|---|
| MDI |  |  |  |  |  |  |
| wt %/eq. basis | 33.8/4.70 | 33.8/4.70 | 33.9/4.70 | 33.6/4.70 | 33.4/4.70 | 38.0/6.03 |
| Diol |  |  |  |  |  |  |
| wt %/eq. basis | 56.7/1.00 | 56.9/1.00 | 56.5/1.00 | 56.4/1.00 | 56.1/1.00 | 50.2/1.00 |

TABLE 1-continued

|  | Comp A | Comp B | Comp C | Comp D | Comp E | Example 1 |
|---|---|---|---|---|---|---|
| BDO | | | | | | |
| wt %/eq. basis | 9.5/3.67 | 8.5/3.29 | 7.5/2.91 | 8.4/3.28 | 7.4/2.90 | 9.0/3.97 |
| eq % based on Chain Extender | 100* | 90* | 80* | 90* | 80* | 80* |
| PDO | | | | | | |
| wt %/eq. basis | | 0.8/0.37 | 1.6/0.74 | | | 1.0/0.5 |
| eq % based on Chain Extender | | 10%* | 20%* | | | 10%* |
| CHDM | | | | | | |
| wt %/eq. basis | | | | 1.5/0.37 | 3.0/0.74 | 1.8/0.5 |
| eq % based on Chain Extender | | | | 10%* | 20%* | 10%* |
| Haze | 36 | 32 | 28 | 9.8 | 9.4 | 3.6 |
| Shore A | 92 | 91 | | | | 94 |
| Tensile Strength | 6710 | 6620 | 5730 | 7150 | 5560 | 6220 |
| % Elongation | 530 | 500 | 560 | 510 | 590 | 400 |
| 100% Modulus | 1080 | 1030 | 990 | 990 | 930 | 1570 |
| 300% Modulus | 2190 | 2120 | 1780 | 2120 | 1630 | 4390 |

*Based on total equivalents of chain extenders

The data shown above demonstrate the surprising effect of the combination of BDO, PDO and CHDM. The use of the second linear chain extender alone (Comparative Compositions B and C) has little affect on the TPU haze level compared to the use of BDO alone. The combination of CHDM and BDO chain extenders in Comparative Compositions D and E provides generally good haze values but increasing the CHDM level from 10% to 20% of the total number of moles of chain extender causes no improvement in clarity. However, a mixture of BDO with 10% PDO and 10% CHDM surprising reduces haze even further.

The invention claimed is:

1. A thermoplastic polyurethane (TPU) comprising soft segment structural units and hard segment structural units characterized in that it comprises:
   a. soft segment units in an amount of from about 30 to about 70 weight percent based on total thermoplastic polyurethane weight, wherein the soft segment units comprise units of polycaprolactone diol, and
   b. hard segment units in an amount of from about 30 to about 70 weight percent based on total thermoplastic polyurethane weight, which hard segment comprises structural units of: b.1 chain extender and b.2 diisocyanate; wherein the chain extender units consist essentially of
      b.1.1. butanediol chain extender units in an amount of from about 30% to about 96% equivalent percent based on total equivalents of chain extender;
      b.1.2. 1,3-propanediol chain extender units in an amount of from about 2% to about 35% equivalent percent based on total equivalents of chain extender; and
      b.1.3. cyclohexanedimethanol chain extender units in an amount of from about 2% to about 35% equivalent percent based on total equivalents of chain extender;
   wherein the molar ratio of the isocyanate functional units to the sum of the isocyanate-reactive functional units is from about 0.95:1 to about 1.10:1, and
   wherein the thermoplastic polyurethane has less than 30% haze as measured by ASTM D 1003-95 and has a hardness greater than about 80A as measured using the Shore A scale and less than about 75D as measured using the Shore D scale.

2. The thermoplastic polyurethane of claim 1 wherein the chain extender units consist essentially of:
   b.1.1. butanediol chain extender units in an amount of from about 60% to about 90% equivalent percent based on total equivalents of chain extender;
   b.1.2 1,3-propanediol chain extender units in an amount of from about 5% to about 20% equivalent percent based on total equivalents of chain extender; and
   b.1.3. cyclohexanedimethanol chain extender units in an amount of from about 5% to about 20% equivalent percent based on total equivalents of chain extender.

3. The thermoplastic polyurethane of claim 1 wherein the chain extender units consist essentially of:
   b.1.2. 1,3-propanediol chain extender units in an amount of from about 8% to about 15% equivalent percent based on total equivalents of chain extender;
   b.1.3. cyclohexanedimethanol chain extender units in an amount of from about 8% to about 15% equivalent percent based on total equivalents of chain extender; and
   b.1.1. butanediol chain extender units in an amount that makes up the balance of chain extender.

4. The thermoplastic polyurethane of claim 1 which has a haze value of less than about 20% as measured by ASTM D 1003-95.

5. The thermoplastic polyurethane of claim 1 which has a haze value of less than about 10% as measured by ASTM D 1003-95.

6. The thermoplastic polyurethane of claim 1 which has a hardness greater than about 85A and less than about 100A.

7. The thermoplastic polyurethane of claim 1 comprising:
   a. polycaprolactone diol soft segment units in an amount of from about 40 to about 60 weight percent based on total TPU thermoplastic polyurethane weight and
   b. hard segment units in an amount of from about 60 to about 40 weight percent based on total thermoplastic polyurethane weight, which hard segment comprises structural units of: (b.1) chain extender and (b.2) 4,4'-diisocyanatodiphenylmethane; wherein the chain extender units consist essentially of:
      b.1.1. butanediol chain extender units in an amount of from about 80% to about 90% equivalent percent based on total equivalents of chain extender;

b.1.2. 1,3-propanediol chain extender units, in an amount of from about 5% to about 15% equivalent percent based on total equivalents of chain extender;

b.1.3. cyclohexane dimethanol chain extender units in an amount of from about 5% to about 15% equivalent percent based on total equivalents of chain extender;

wherein the index is from about 0.99 to about 1.05.

8. The thermoplastic polyurethane of claim 1 which is a cast article, an injection molded article, an adhesive, an extruded article, a coating, a film, or a sealant.

* * * * *